(12) United States Patent
Tanigawa

(10) Patent No.: US 12,696,139 B2
(45) Date of Patent: Jul. 28, 2026

(54) WIRELESS DEVICE, METHOD, AND COMPUTER READABLE MEDIUM

(71) Applicant: BUFFALO INC., Tokyo (JP)

(72) Inventor: Masaya Tanigawa, Aichi (JP)

(73) Assignee: BUFFALO INC., Tokyo (JP)

( * ) Notice: Subject to any disclaimer, the term of this patent is extended or adjusted under 35 U.S.C. 154(b) by 314 days.

(21) Appl. No.: 18/604,762

(22) Filed: Mar. 14, 2024

(65) Prior Publication Data

US 2024/0314640 A1     Sep. 19, 2024

(30) Foreign Application Priority Data

Mar. 17, 2023     (JP) ................................. 2023-042636

(51) Int. Cl.
*H04W 28/20* (2009.01)
*H04W 72/0453* (2023.01)
*H04W 76/10* (2018.01)

(52) U.S. Cl.
CPC ....... *H04W 28/20* (2013.01); *H04W 72/0453* (2013.01); *H04W 76/10* (2018.02)

(58) Field of Classification Search
None
See application file for complete search history.

(56) References Cited

U.S. PATENT DOCUMENTS

| | | | | |
|---|---|---|---|---|
| 2018/0132171 A1* | 5/2018 | Mendahawi | .......... | H04W 76/14 |
| 2018/0338336 A1* | 11/2018 | Seo | ........................ | H04W 76/10 |
| 2023/0388987 A1* | 11/2023 | Alpert | .................... | H04B 1/715 |

OTHER PUBLICATIONS

Kendra Luciano, "The Off-Road Trail to 6 GHz AP Discovery", Extreme Networks, Retrieved from Internet: URL: https://www.extremenetworks.com/extreme-networks-blog/the-off-road-trail-to-6-ghz-ap-discovery/, Apr. 12, 2018, 9 pages.
"Google Pixel 6 Wi-Fi 6E Scanning and 6 GHz SSID Discovery", Jiri Brejcha, Retrieved from Internet: https://www.jiribrejcha.net/2022/11/google-pixel-6-wi-fi-6e-scanning-and-6-ghz-ssiddiscovery/, Nov. 10, 2022, 10 pages.

* cited by examiner

*Primary Examiner* — Angela Nguyen
(74) *Attorney, Agent, or Firm* — XSENSUS LLP

(57) ABSTRACT

A wireless device includes: a first wireless interface; and a second wireless interface configured to operate on a predetermined channel. In response to a connection request for requesting connection to the predetermined channel on which the second wireless interface is operating being received from a wireless terminal, the second wireless interface transmits, to the wireless terminal, a signal instructing the wireless terminal to change a connection destination of the wireless terminal to a channel on which the first wireless interface is operating.

18 Claims, 5 Drawing Sheets ch. 195    ch. 211    ch. 227    ch. 259  ch. 263  ch. 275

→ FREQUENCY

FREQUENCY BAND OF 6 GHz

30

10

ACCESS POINT (WIRELESS DEVICE)

11

PROCESSOR

14 — WIRELESS COMMUNICATION I/F (6 GHz / ch. 263)

WIRELESS BEACON I/F (6 GHz / ch. 195) — 15

WIRELESS TERMINAL

WIRELESS DEVICE, METHOD, AND COMPUTER READABLE MEDIUM

CROSS-REFERENCE TO RELATED APPLICATION

This application is based on and claims priority under 35 USC 119 from Japanese Patent Application No. 2023-042636 filed on Mar. 17, 2023, the entire content of which is incorporated herein by reference.

TECHNICAL FIELD

The present disclosure relates to a wireless device, a method, and a computer readable medium.

BACKGROUND ART

Wi-Fi 6E (registered trademark) using a high-speed and stable-frequency band of 6 GHz has been known in a wireless local area network (LAN) in addition to conventional frequency bands of 2.4 GHz and 5 GHz.

In the Wi-Fi 6E, the number of channels of 6 GHz is large, and it takes time for a client of the wireless LAN to scan all of the channels. Therefore, a specification has been developed in which a part of the channels of 6 GHz are set as Preferred Scanning Channels (PSCs), and the client of the wireless LAN terminal scans only the PSCs among the channels of 6 GHz.

In such a specification in which the client of the wireless LAN scans only the PSCs among the channels of 6 GHz, there is a problem that the client of the wireless LAN cannot detect an access point operating only on a channel other than the PSCs among the channels of 6 GHz, and cannot be wirelessly connected thereto. As a countermeasure against this problem, there is a mechanism called "Out-band discovery" in which an access point that performs communication at 6 GHz assigns a number of a channel of 6 GHz to a beacon of 2.4 GHz or 5 GHz and transmits the beacon, and for example, "The Off-Road Trail to 6 GHZ AP Discovery", "Extreme", [online], "Research on Mar. 1, 2023", Internet <URL: https://www.extrementworks.com/extreme-net-works-blog/the-off-road-trail-to-6-ghz-ap-discovery/> is disclosed.

SUMMARY

According to the present disclosure, there is provided a wireless device including: a first wireless interface; and a second wireless interface configured to operate on a predetermined channel, in which in response to a connection request for requesting connection to the predetermined channel on which the second wireless interface is operating being received from a wireless terminal, the second wireless interface transmits, to the wireless terminal, a signal instructing the wireless terminal to change a connection destination of the wireless terminal to a channel on which the first wireless interface is operating.

According to the present disclosure, there is provided a method for a wireless device, the wireless device including a first wireless interface, and a second wireless interface configured to operate on a predetermined channel, the method including: in response to a connection request for requesting connection to the predetermined channel on which the second wireless interface is operating being received from a wireless terminal, transmitting, to the wireless terminal from the second wireless interface, a signal instructing the wireless terminal to change a connection destination of the wireless terminal to a channel on which the first wireless interface is operating, by the second wireless interface.

According to the present disclosure, there is provided a non-transitory computer readable medium storing executable instructions of a wireless device including processing circuitry, a first wireless interface, and a second wireless interface configured to operate on a predetermined channel, the executable instructions causing the processing circuitry to execute a process, the process including: in response to a connection request for requesting connection to the predetermined channel on which the second wireless interface is operating being received from a wireless terminal, controlling the second wireless interface to transmit, to the wireless terminal from the second wireless interface, a signal instructing the wireless terminal to change a connection destination of the wireless terminal to a channel on which the first wireless interface is operating.

BRIEF DESCRIPTION OF DRAWINGS

Exemplary embodiment(s) of the present disclosure will be described in detail based on the following figures, wherein:

FIG. 5 is a flowchart showing an example of processing performed by a processor of the access point;

DESCRIPTION OF EMBODIMENTS

Hereinafter, embodiments of the present disclosure will be described with reference to the drawings.

<Configuration of Access Point 10>

Figure 1:
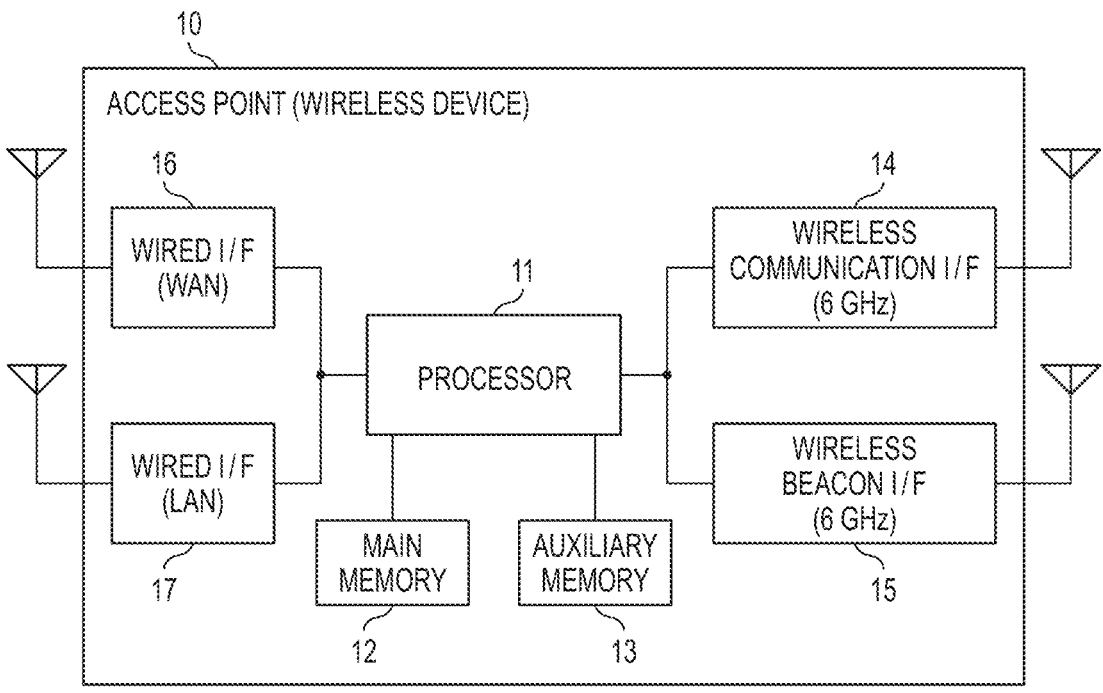
FIG. 1 is a diagram showing a configuration of an access point according to an embodiment of the present disclosure.

FIG. 1 is a diagram showing a configuration of an access point 10 according to an embodiment of the present disclosure. The access point 10 shown in FIG. 1 is an access point of a wireless LAN such as Wi-Fi 6E, and is an example of a wireless device in the present disclosure.

For example, when the access point operates only at 6 GHz, such as when a frequency band used by the access point is limited to 6 GHz due to user settings or when the access point is a wireless device dedicated to 6 GHZ, the above-described mechanism of Out-of-band discovery cannot be used. In this case, there is a possibility that the client of the wireless LAN cannot detect an access point operating only on a channel other than the PSCs among the channels of 6 GHz and cannot be connected thereto.

The access point 10 according to the present disclosure includes a processor 11, a main memory 12, an auxiliary memory 13, a wireless communication I/F 14, a wireless beacon I/F 15, and wired I/Fs 16 and 17.

The processor 11 is an example of processing circuitry that performs signal processing, and is, for example, a central processing unit (CPU) that controls the entire access point 10. The processor 11 may be implemented by another digital circuit such as a Field Programmable Gate Array (FPGA) or a Digital Signal Processor (DSP). The processor 11 may further be implemented by combining a plurality of digital circuits.

The main memory 12 is, for example, a Random Access Memory (RAM). The main memory 12 is used as a work area of the processor 11. The auxiliary memory 13 is a nonvolatile memory such as a magnetic disk, an optical disk, or a flash memory. The auxiliary memory 13 stores various programs for operating the access point 10. The programs stored in the auxiliary memory 13 are loaded into the main memory 12 and executed by the processor 11.

The wireless communication I/F 14 is a communication interface that performs wireless communication with a wireless terminal. The wireless communication I/F 14 performs wireless communication using only a frequency band of 6 GHz according to the user settings or specifications of the access point 10. The wireless communication I/F 14 is an example of a first wireless interface.

The wireless beacon I/F 15 is a communication interface that transmits a wireless signal to the wireless terminal. The wireless beacon I/F 15 may wirelessly transmit a control signal such as a beacon signal in a frequency band of 6 GHz. The wireless beacon I/F 15 does not perform high-speed data communication with the wireless terminal, and thus may be a communication interface that is simpler (for example, the number of antennas is smaller) than the wireless communication I/F 14. The wireless beacon I/F 15 is an example of a second wireless interface.

The wired I/F 16 is connected to a wide area network (WAN) such as the Internet, and communicates with another communication device via the WAN. The wired I/F 17 constitutes a wired LAN and communicates with another communication device via the LAN.

For example, the access point 10 relays data communication between the wireless terminal and a communication device on a WAN side by communicating with the wireless terminal using the wireless beacon I/F 15 and communicating with the communication device on the WAN side using the wired I/F 16. That is, the access point 10 relays the data communication between the wireless terminal and the network (communication device on the WAN side) using the wireless communication I/F 14. The access point 10 does not relay the data communication between the wireless terminal and the network using the wireless beacon I/F 15.

The access point 10 relays data communication between a communication terminal on a LAN side and a communication device on a WAN side by communicating with the communication terminal on the LAN side using the wired I/F 17 and communicating with the communication device on the WAN side using the wired I/F 16.

<Configuration of Wireless Terminal 20>

Figure 2:
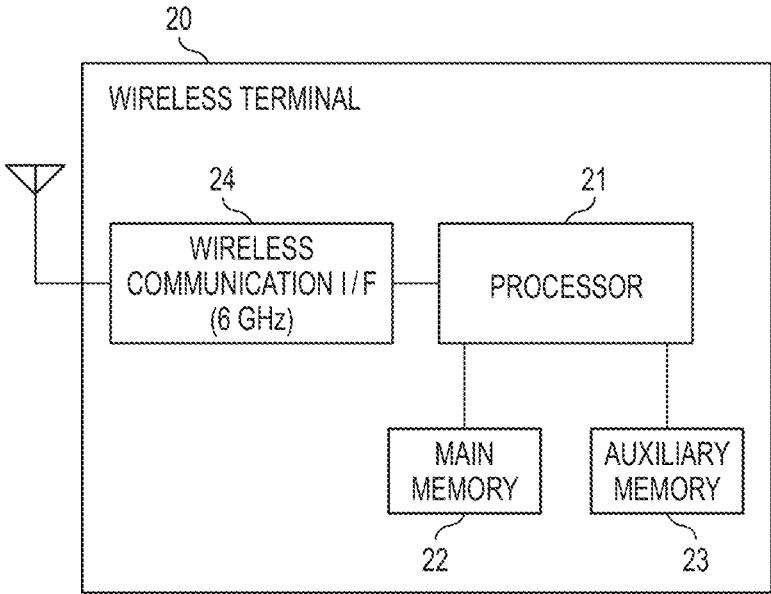
FIG. 2 is a diagram showing a configuration of a wireless terminal as an example of a wireless terminal.

FIG. 2 is a diagram showing a configuration of a wireless terminal 20 which is an example of the wireless terminal. The wireless terminal 20 shown in FIG. 2 is a wireless terminal supporting wireless communication of a wireless LAN such as Wi-Fi 6E.

The wireless terminal 20 includes a processor 21, a main memory 22, an auxiliary memory 23, and a wireless communication I/F 24.

The processor 21 is processing circuitry that performs signal processing, and is, for example, a CPU that controls the entire wireless terminal 20. The processor 21 may be implemented by another digital circuit such as an FPGA or a DSP. The processor 21 may further be implemented by combining a plurality of digital circuits.

The main memory 22 is, for example, a RAM. The main memory 22 is used as a work area of the processor 21. The auxiliary memory 23 is a nonvolatile memory such as a magnetic disk, an optical disk, or a flash memory. The auxiliary memory 23 stores various programs for operating the wireless terminal 20. The programs stored in the auxiliary memory 23 are loaded into the main memory 22 and executed by the processor 21.

The wireless communication I/F 24 is a communication interface that performs wireless communication with the wireless terminal. The wireless communication I/F 24 may perform wireless communication using a frequency band of 6 GHz at least. Further, the wireless communication I/F 24 may perform wireless communication using a frequency band of 2.4 GHz or 5 GHz in addition to the frequency band of 6 GHZ.

<Channels in Frequency Band of 6 GHZ>

Figure 3:
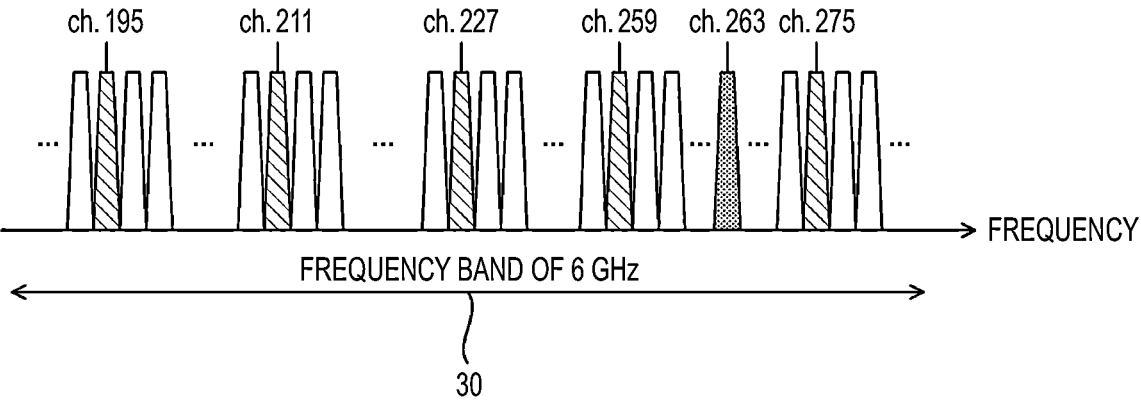
FIG. 3 is a diagram showing an example of each channel in a frequency band of 6 GHz.

FIG. 3 is a diagram showing an example of channels in the frequency band of 6 GHZ. A frequency band 30 in FIG. 3 is a frequency band of 6 GHZ, and is, for example, a frequency band from 5925 MHz to 6425 MHZ (a width of 500 MHZ). Many channels ( . . . , ch. 195, . . . , ch. 275, . . . ) are set in the frequency band 30. It is assumed that a part of the channels (ch. 195, ch. 211, ch. 227, ch. 259, ch. 275, . . . ) indicated by diagonal lines are set as PSCs. The PSC is an example of a predetermined channel in the present disclosure.

Further, the access point 10 performs data communication on, for example, the ch. 263, which is not the PSC, using the wireless communication I/F 14. When being wirelessly connected to the access point 10 at 6 GHZ, the wireless terminal 20 preferentially scans the ch. 195, the ch. 211, the ch. 227, the ch. 259, the ch. 275, and the like which are the PSCs.

<Operation of Access Point 10>

Figure 4:
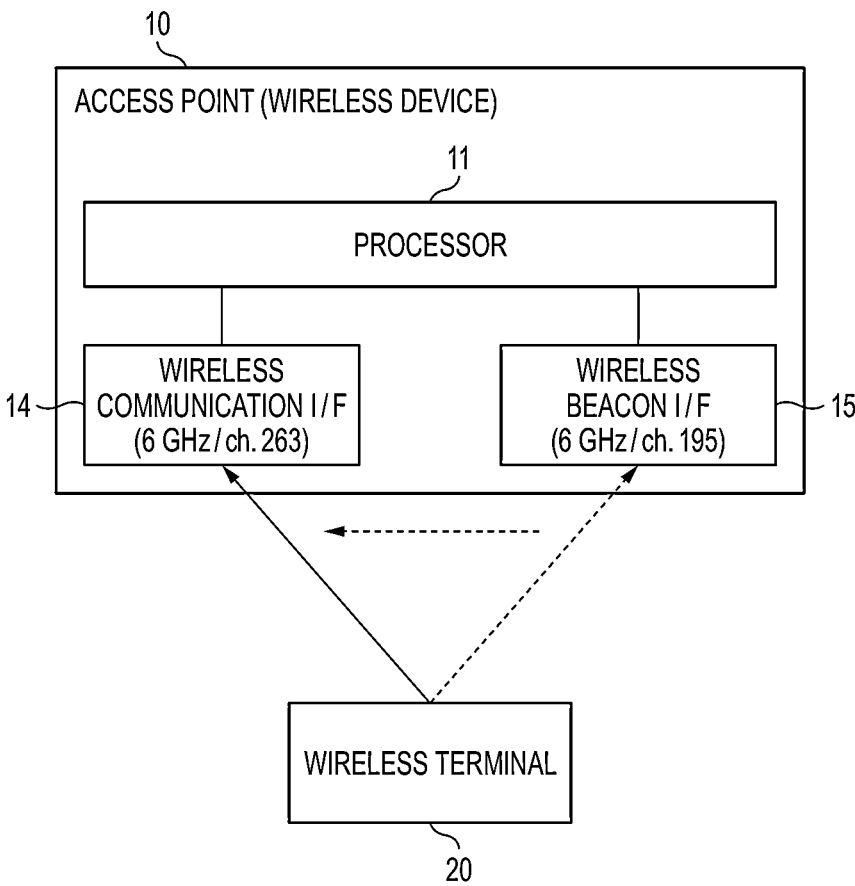
FIG. 4 is a diagram showing an example of an operation of the access point.

FIG. 4 is a diagram showing an example of an operation of the access point 10. FIG. 4 shows only the processor 11, the wireless communication I/F 14, and the wireless beacon I/F 15 in the configuration of the access point 10 shown in FIG. 1.

The wireless communication I/F 14 operates on the ch. 263 which is not the PSC. For example, the wireless communication I/F 14 periodically (for example, every 100 milliseconds) transmits a beacon on the ch. 263. When a wireless terminal (for example, the wireless terminal 20) transmits a connection request signal based on the beacon transmitted by the wireless communication I/F 14, the wireless communication I/F 14 is wirelessly connected to the wireless terminal to perform data communication.

The wireless beacon I/F 15 operates on the ch. 195 which is the PSC. For example, the wireless beacon I/F 15 periodically (for example, every 100 milliseconds) transmits a beacon on the ch. 195. When a wireless terminal (for example, the wireless terminal 20) transmits a connection request signal to the wireless beacon I/F 15 based on the beacon transmitted by the wireless beacon I/F 15, the wireless beacon I/F 15 transmits, to the wireless terminal, a channel switching instruction (control signal) instructing the wireless terminal to change a connection destination thereof to the channel on which the wireless communication I/F 14 is operating.

In the example of FIG. 4, when the wireless terminal 20 scans the PSCs, the wireless terminal 20 receives a beacon of the ch. 195 and transmits a connection request on the ch. 195 to the access point 10. In response to this, the access point 10 transmits, from the wireless beacon I/F 15 to the wireless terminal 20, a channel switching instruction instructing the wireless terminal 20 to change a connection destination thereof to the ch. 263 on which the wireless communication I/F 14 is operating, as the control signal. The channel switching instruction includes information related to channel switching.

The wireless terminal 20 transmits a connection request on the ch. 263 to the access point 10 based on the channel switching instruction. In response to this, using the wireless communication I/F 14, the access point 10 is wirelessly connected with the wireless terminal 20 on the ch. 263 and performs data communication with the wireless terminal 20.

As described above, the wireless beacon I/F 15 periodically transmits a beacon (control signal) on the PSC of 6 GHZ, and does not perform data communication. The wireless beacon I/F 15 transmits only the beacon (control signal) as the signal to be periodically transmitted, and irregularly transmits the control signal such as the channel switching instruction described above.

<Processing Performed by Processor 11 of Access Point 10>

Figure 5:
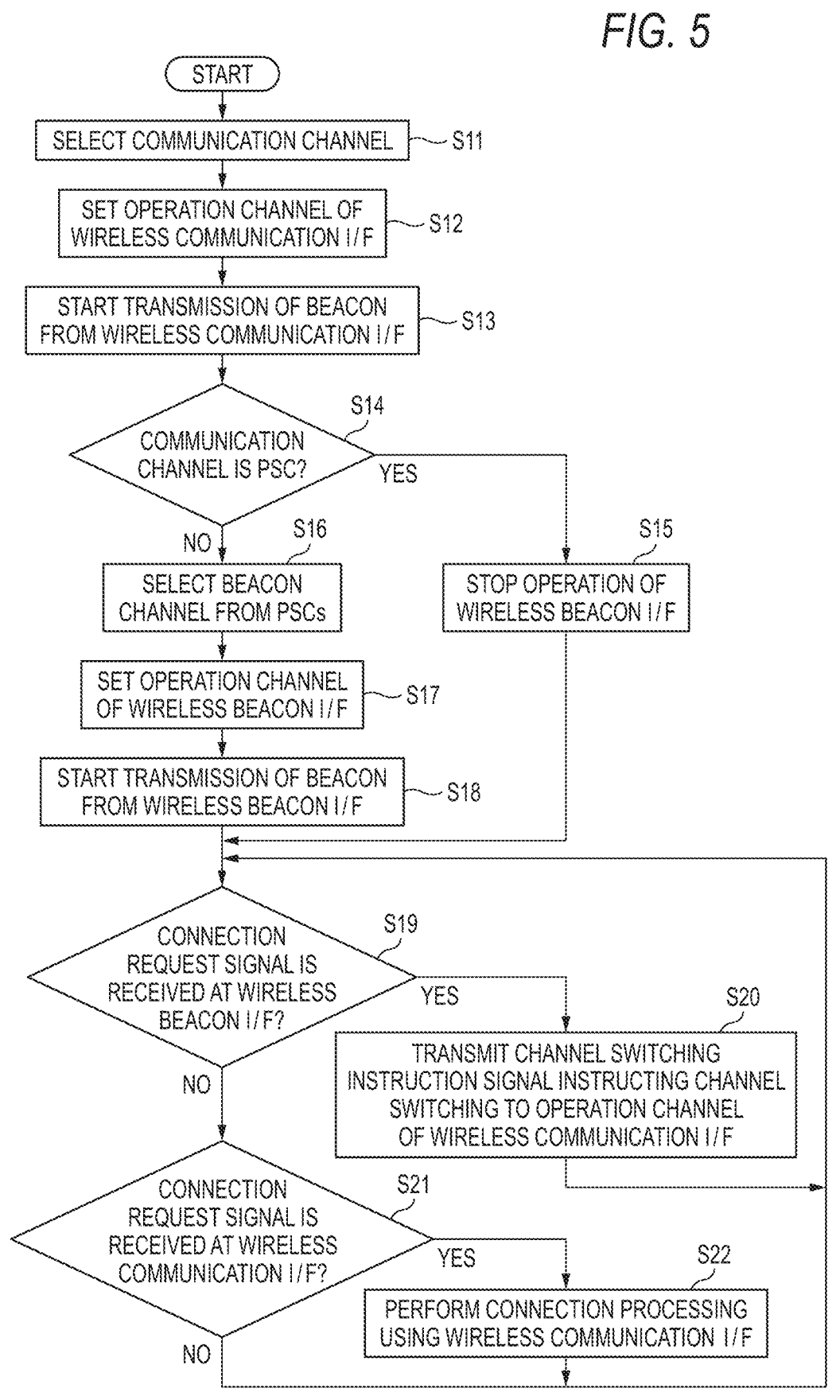

FIG. 5 is a flowchart showing an example of processing performed by the processor 11 of the access point 10. First, the processor 11 selects a communication channel to be used by the wireless communication I/F 14 (step S11). For example, the processor 11 selects the communication channel from among the channels of 6 GHz based on a preset setting or an instruction from a user.

Next, the processor 11 sets an operation channel of the wireless communication I/F 14 to the channel selected in step S11 (step S12). Next, the processor 11 performs control to start transmission of a beacon from the wireless communication I/F 14 on the operation channel set in step S12 (step S13).

Next, the processor 11 determines whether the communication channel selected in step S11 is the PSC (step S14). When the channel is the PSC (step S14: Yes), the processor 11 performs control to stop the operation of the wireless beacon I/F 15 (step S15), and proceeds to step S19. The stop of the operation of the wireless beacon I/F 15 means, for example, a state in which the wireless beacon I/F 15 does not transmit and receive a wireless signal, and is, for example, a state in which power is not supplied to the wireless beacon I/F 15. In a case where the operation of the wireless beacon I/F 15 has been already stopped, the processor 11 skips step S15 and proceeds to step S19.

In step S14, when the channel is not the PSC (step S14: No), the processor 11 selects a beacon channel to be used by the wireless beacon I/F 15 from the PSCs (step S16). For example, the processor 11 selects the beacon channel from among the PSCs based on a preset setting or an instruction from a user.

Next, the processor 11 sets an operation channel of the wireless beacon I/F 15 to the channel selected in step S16 (step S17). Next, the processor 11 performs control to start transmission of a beacon from the wireless beacon I/F 15 on the operation channel set in step S16 (step S18).

Next, the processor 11 determines whether a connection request signal from a wireless terminal (for example, the wireless terminal 20) is received at the wireless beacon I/F 15 (step S19). When the connection request signal is received at the wireless beacon I/F 15 (step S19: Yes), the processor 11 uses the wireless beacon I/F 15 to transmit, to the wireless terminal which is a transmission source of the connection request signal (step S20), the channel switching instruction signal instructing the wireless terminal to switch a connection destination thereof to the operating channel of the wireless communication I/F 14, and returns to step S19.

The channel switching instruction signal may be transmitted using, for example, a frame of 802.11k standard or 802.11v standard contained in IEEE 802.11, or a frame of a channel switch announcement (CSA).

In step S19, when the connection request signal is not received at the wireless beacon I/F 15 (step S19: No), the processor 11 determines whether the connection request signal from the wireless terminal (for example, the wireless terminal 20) is received at the wireless communication I/F 14 (step S21). When the connection request signal is received at the wireless communication I/F 14 (step S21: Yes), the processor 11 performs, using the wireless communication I/F 14, connection processing of wirelessly connecting to the wireless terminal which is the transmission source of the connection request signal (step S22), and returns to step S19.

In step S21, when the connection request signal is not received at the wireless communication I/F 14 (step S21: No), the processor 11 returns to step S19.

<Selection of Beacon Channel Corresponding to Communication Channel>

In step S16, the processor 11 may select, from the PSCs of 6 GHZ, a channel not adjacent to the communication channel on which the wireless communication I/F 14 is operating, as the beacon channel. Accordingly, interference between wireless communication using the wireless communication I/F 14 and wireless transmission of a beacon or the like using the wireless beacon I/F 15 may be prevented.

A channel not adjacent to the communication channel means a channel between which and the communication channel there are one or more other channels. That is, as shown in FIG. 3, in the frequency band 30 of 6 GHZ, center frequencies of the channels are discretely set (for example, at regular intervals), and the channel not adjacent to the communication channel means a channel not adjacent to the communication channel in the center frequency (one or more other center frequencies exist therebetween).

For example, the processor 11 selects a PSC whose frequency is farthest from that of the communication channel among the PSCs of 6 GHZ, as the beacon channel. For example, when the communication channel is the ch. 263, the processor 11 selects a PSC (for example, ch. 195) whose frequency is farthest from that of the ch. 263 as the beacon channel from among the PSCs of 6 GHZ.

Operation Example 1 of Access Point 10 and
Wireless Terminal 20

Figure 6:
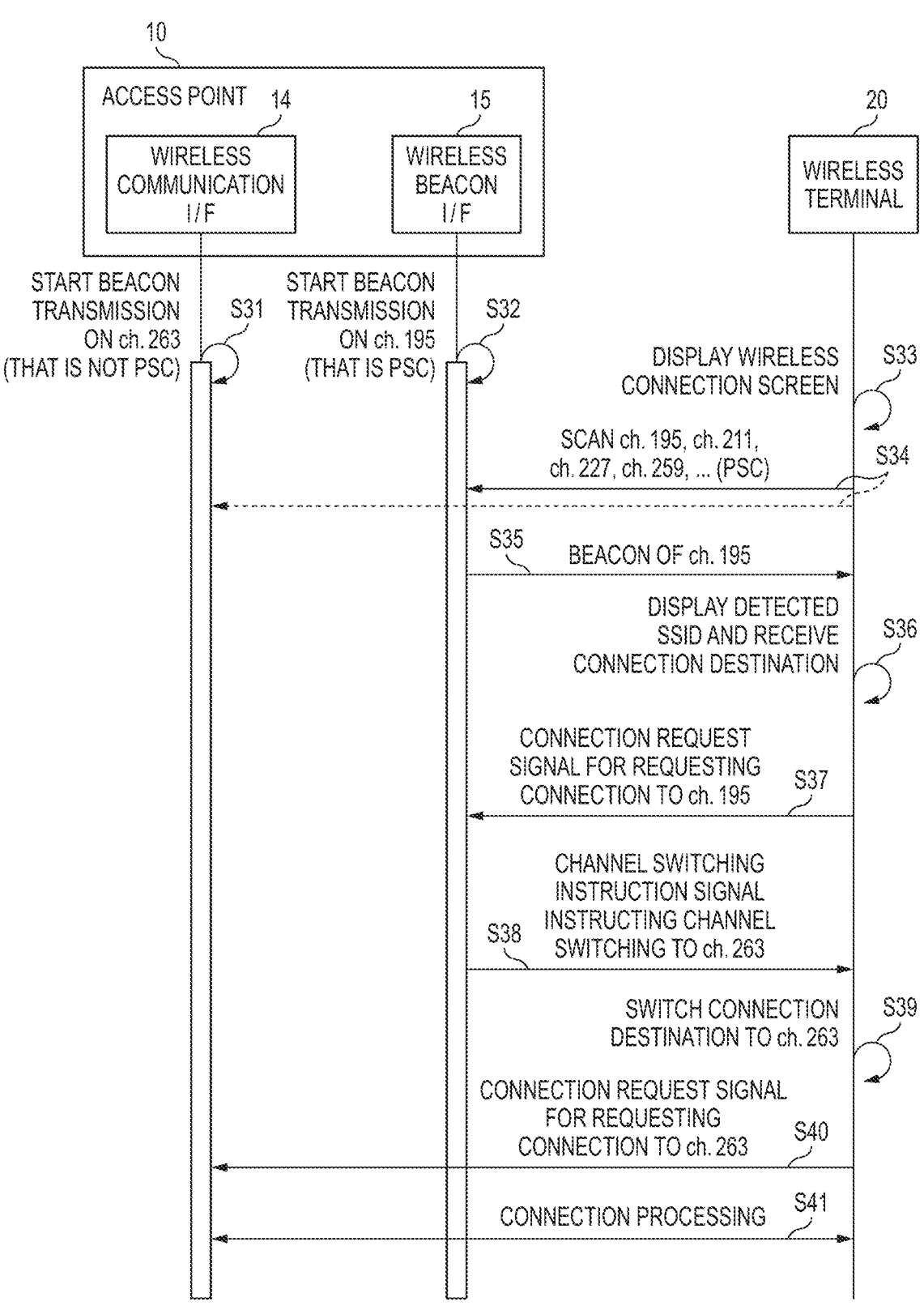
FIG. 6 is a sequence diagram showing an example of Operation Example 1 of the access point and the wireless terminal.

FIG. 6 is a sequence diagram showing an example of Operation Example 1 of the access point 10 and the wireless terminal 20. In the example shown in FIG. 6, it is assumed that the access point 10 selects, as the communication channel, the ch. 263 which is not the PSC. In this case, the access point 10 starts transmitting a beacon on the ch. 263 by the wireless communication I/F 14 (step S31). The beacon includes information for transmitting a connection request signal for requesting connection to the ch. 263, such as a service set identifier (SSID) of the ch. 263.

In addition, the access point 10 starts transmitting a beacon using the wireless beacon I/F 15, for example, on the ch. 195 which is the PSC (step S32). The beacon includes information for transmitting a connection request signal for requesting connection to the ch. 195, such as an SSID of the ch. 195. Steps S31 and S32 are executed, for example, when the access point 10 is started up.

Next, the wireless terminal 20 displays a wireless connection screen based on a user operation or the like on the wireless terminal 20 (step S33). Next, the wireless terminal 20 scans the PSCs (ch. 195, ch. 211, ch. 227, ch. 259, ch. 275, . . . ) in order to detect a wirelessly connectable channel (step S34). Then, the wireless terminal 20 receives the beacon that is transmitted by the access point 10 using the wireless beacon I/F 15 on the ch. 195 (step S35).

Next, the wireless terminal 20 displays the SSID of the channel on which the beacon is received in step S35, and receives the SSID of the connection destination from the displayed SSID (step S36). In this example, the wireless terminal 20 receives the beacon on the ch. 195 in step S35, and thus displays the SSID of the ch. 195. In this example, it is assumed that the SSID of the ch. 195 is selected as the connection destination.

Next, the wireless terminal 20 transmits a connection request signal for requesting connection to the ch. 195 (step S37). Next, in response to the connection request signal received in step S37, the access point 10 transmits, to the wireless terminal 20 using the wireless beacon I/F 15, a channel switching instruction signal instructing the wireless terminal 20 to switch the connection destination thereof to the ch. 263 on which the wireless communication I/F 14 is operating (step S38). The channel switching instruction signal includes information related to the ch. 263, such as the SSID of the ch. 263.

Next, the wireless terminal 20 switches the connection destination from the ch. 195 to the ch. 263 in response to the channel switching instruction signal received in step S38 (step S39). Next, the wireless terminal 20 transmits a connection request signal for requesting connection to the ch. 263 (step S40). Next, the access point 10 performs connection processing of wirelessly connecting, on the ch. 263, to the wireless terminal 20 using the wireless communication I/F 14 (step S41).

Accordingly, the wireless terminal 20 is brought into a state of being wirelessly connected to the access point 10 on the ch. 263, and may perform data communication with the communication device on the WAN side due to the relay of the access point 10.

Operation Example 2 of Access Point 10 and Wireless Terminal 20

Figure 7:
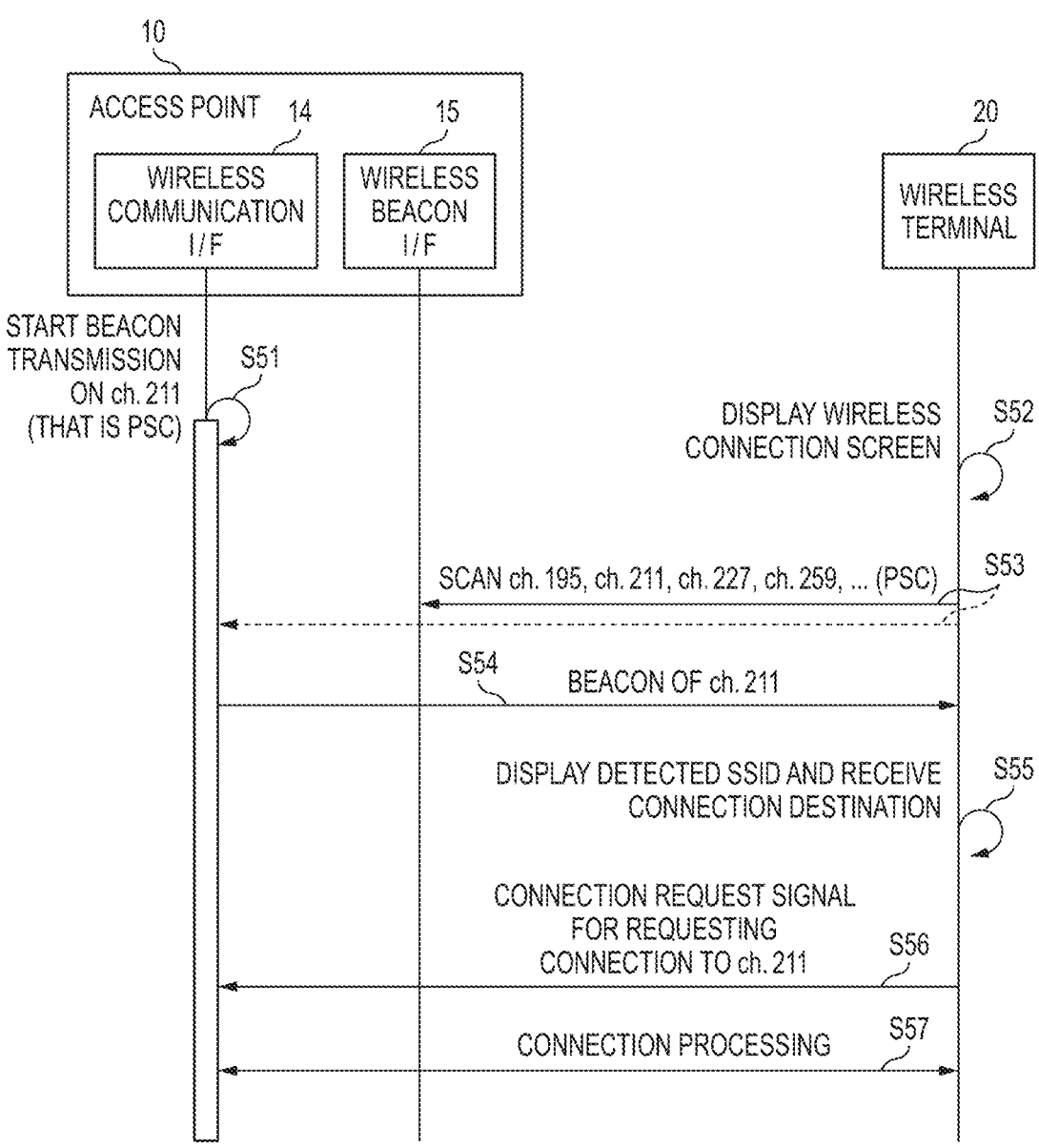
FIG. 7 is a sequence diagram showing an example of Operation Example 2 of the access point and the wireless terminal.

FIG. 7 is a sequence diagram showing an example of Operation Example 2 of the access point 10 and the wireless terminal 20. In the example of FIG. 7, it is assumed that the access point 10 selects the ch. 211 which is the PSC as the communication channel. In this case, first, the access point 10 starts transmitting a beacon on the ch. 211 using the wireless communication I/F 14 (step S51). Further, the access point 10 stops the operation of the wireless beacon I/F 15 and does not transmit a beacon using the wireless beacon I/F 15.

Next, the wireless terminal 20 displays a wireless connection screen based on a user operation or the like on the wireless terminal 20 (step S52). Next, the wireless terminal 20 scans the PSCs (ch. 195, ch. 211, ch. 227, ch. 259, ch. 275, . . . ) in order to detect a wirelessly connectable channel (step S53). Then, the wireless terminal 20 receives the beacon that is transmitted by the access point 10 using the wireless communication I/F 14 on the ch. 211 (step S54).

Next, the wireless terminal 20 displays the SSID of the channel on which the beacon is received in step S54, and receives the SSID of the connection destination from the displayed SSID (step S55). In this example, the wireless terminal 20 receives the beacon on the ch. 211 in step S54, and thus displays the SSID of the ch. 211. In this example, it is assumed that the SSID of the ch. 211 is selected as the connection destination.

Next, the wireless terminal 20 transmits a connection request signal for requesting connection to the ch. 211 (step S56). Next, the access point 10 performs connection processing of wirelessly connecting, on the ch. 211, to the wireless terminal 20 using the wireless communication I/F 14 (step S57).

Accordingly, the wireless terminal 20 is brought into a state of being wirelessly connected to the access point 10 on the ch. 211, and may perform data communication with the communication device on the WAN side due to the relay of the access point 10.

As described above, the access point 10 includes the wireless beacon I/F 15 that operates on the PSC (predetermined channel) of 6 GHz in addition to the wireless communication I/F 14 that operates on the channel of 6 GHz to perform data communication. The wireless beacon I/F 15 repeatedly (for example, periodically every 100 milliseconds) transmits a beacon on the PSC. When a connection request for requesting connection to the PSC is received from the wireless terminal 20, the wireless beacon I/F 15 transmits, to the wireless terminal 20, a channel switching instruction signal (control signal) instructing the wireless terminal 20 to change the connection destination thereof to the channel on which the wireless communication I/F 14 is operating.

Accordingly, even when the wireless communication I/F 14 of the access point 10 performs wireless communication only on a channel of 6 GHz that is not the PSC, the wireless terminal 20 may detect the access point 10 by scanning the PSCs of 6 GHZ. The wireless terminal 20 may be wirelessly connected to the wireless communication I/F 14 of the access point 10 by changing the connection destination according to the channel switching instruction signal from the access point 10. Therefore, a situation in which the wireless terminal 20 cannot be wirelessly connected to the access point 10 may be reduced, and the interconnectivity of wireless communication may be improved.

Since the wireless beacon I/F 15 may have a simpler configuration than the wireless communication I/F 14, the configuration of the access point 10 may be simplified as compared with a configuration in which a wireless communication interface is provided separately from the wireless communication I/F 14.

As described with reference to FIG. 5, the PSC on which the wireless beacon I/F 15 operates may be a channel of 6 GHz that is not adjacent to the channel on which the wireless communication I/F 14 is operating. Accordingly, interference between wireless communication using the wireless communication I/F 14 and wireless transmission of a beacon or the like using the wireless beacon I/F 15 may be prevented.

As described with reference to FIGS. 5 and 7, the wireless beacon I/F 15 may stop when the wireless communication I/F 14 is operating on the PSC. Accordingly, in a state in which the wireless terminal 20 may directly detect the access point 10 by scanning the PSCs of 6 GHz, it is possible to save power on the wireless communication I/F 14, and radio wave interference due to the wireless transmission may be prevented.

(Modification)

Although a configuration in which the access point 10 is provided with the wired I/F 17 has been described, the access point 10 may not be provided with the wired I/F 17.

Although a configuration in which the access point 10 and the wireless terminal 20 perform the wireless communication according to the Wi-Fi 6E has been described, the communication standard used for the wireless communication between the access point 10 and the wireless terminal 20 is not limited to the Wi-Fi 6E, and may be, for example, a successor standard of the Wi-Fi 6E.

Although a case has been described in which the number of each channel in the frequency band 30, which is the frequency band of 6 GHZ, is a number starting from 191 ch (that is, . . . , ch. 195, . . . , ch. 275, . . . ), the number of each channel in the frequency band 30 is not limited to thereto. For example, the number of each channel in the frequency band 30 may be a number starting from ch. 1 (that is, ch. 1, ch. 2, ch. 3, . . . ).

The above-described embodiments may be implemented in combination.

(Control Program)

The control method described in the above embodiment may be implemented by executing, on a computer, a control program prepared in advance. The control program is stored in a computer-readable storage medium and is executed by being read from the storage medium. The control program may be provided in a form of being stored in a non-transitory computer readable storage medium such as a flash memory, or may be provided via a network such as the Internet. The computer that executes the control program may be provided in the wireless device, may be provided in an electronic device such as a smartphone, a tablet terminal, or a personal computer that may communicate with the wireless device, or may be provided in a server device that may communicate with the wireless device and the electronic device.

As described above, the following matters are disclosed in this specification.

A wireless device disclosed herein includes: a first wireless interface; and a second wireless interface configured to operate on a predetermined channel. In response to a connection request for requesting connection to the predetermined channel on which the second wireless interface is operating being received from a wireless terminal, the second wireless interface transmits, to the wireless terminal, a signal instructing the wireless terminal to change a connection destination of the wireless terminal to a channel on which the first wireless interface is operating.

In the wireless device disclosed herein, the second wireless interface may periodically transmit a control signal on the predetermined channel.

In the wireless device disclosed herein, the predetermined channel may be included in a frequency band in which the channel on which the first wireless interface is operating is included.

In the wireless device disclosed herein, the predetermined channel may be a channel on which the wireless terminal preferentially performs scanning in the frequency band.

In the wireless device disclosed herein, the predetermined channel may be a channel not adjacent to the channel on which the first wireless interface is operating in the frequency band.

In the wireless device disclosed herein, the predetermined channel may be a Preferred Scanning Channel.

In the wireless device disclosed herein, the second wireless interface may stop operating when the first wireless interface is operating on the predetermined channel.

In the wireless device disclosed herein, the wireless device may be an access point that relays data communication between the wireless terminal and a network, the data communication may be relayed using the first wireless interface, and the data communication may not be relayed using the second wireless interface.

A method, disclosed herein, for a wireless device, the wireless device including a first wireless interface, and a second wireless interface configured to operate on a predetermined channel, the method includes: in response to a connection request for requesting connection to the predetermined channel on which the second wireless interface is operating being received from a wireless terminal, transmitting, to the wireless terminal from the second wireless interface, a signal instructing the wireless terminal to change a connection destination of the wireless terminal to a channel on which the first wireless interface is operating, by the second wireless interface.

Anon-transitory computer readable medium disclosed herein stores executable instructions of a wireless device including processing circuitry, a first wireless interface, and a second wireless interface configured to operate on a predetermined channel, the executable instructions causing the processing circuitry to execute a process, the process including: in response to a connection request for requesting connection to the predetermined channel on which the second wireless interface is operating being received from a wireless terminal, controlling the second wireless interface to transmit, to the wireless terminal from the second wireless interface, a signal instructing the wireless terminal to change a connection destination of the wireless terminal to a channel on which the first wireless interface is operating.

What is claimed is:

1. A wireless device comprising:
a first wireless interface; and
a second wireless interface configured to operate on a predetermined channel, wherein
in response to a connection request for requesting connection to the predetermined channel on which the second wireless interface is operating being received from a wireless terminal, the second wireless interface transmits, to the wireless terminal, a signal instructing the wireless terminal to change a connection destination of the wireless terminal to a channel on which the first wireless interface is operating.

2. The wireless device according to claim 1, wherein the second wireless interface periodically transmits a control signal on the predetermined channel.

3. The wireless device according to claim 1, wherein the predetermined channel is included in a frequency band in which the channel on which the first wireless interface is operating is included.

4. The wireless device according to claim 3, wherein the predetermined channel is a channel on which the wireless terminal preferentially performs scanning in the frequency band.

5. The wireless device according to claim 3, wherein the predetermined channel is a channel not adjacent to the channel on which the first wireless interface is operating in the frequency band.

6. The wireless device according to claim 1, wherein the predetermined channel is a Preferred Scanning Channel.

7. The wireless device according to claim 1, wherein the second wireless interface stops operating when the first wireless interface is operating on the predetermined channel.

8. The wireless device according to claim 1, wherein the wireless device is an access point that relays data communication between the wireless terminal and a network, the data communication is relayed using the first wireless interface, and the data communication is not relayed using the second wireless interface.

9. A method for a wireless device, the wireless device including a first wireless interface, and a second wireless interface configured to operate on a predetermined channel, the method comprising:

in response to a connection request for requesting connection to the predetermined channel on which the second wireless interface is operating being received from a wireless terminal, transmitting, to the wireless terminal from the second wireless interface, a signal instructing the wireless terminal to change a connection destination of the wireless terminal to a channel on which the first wireless interface is operating, by the second wireless interface.

10. A non-transitory computer readable medium storing executable instructions of a wireless device including processing circuitry, a first wireless interface, and a second wireless interface configured to operate on a predetermined channel, the executable instructions causing the processing circuitry to execute a process, the process comprising:

in response to a connection request for requesting connection to the predetermined channel on which the second wireless interface is operating being received from a wireless terminal, controlling the second wireless interface to transmit, to the wireless terminal from the second wireless interface, a signal instructing the wireless terminal to change a connection destination of the wireless terminal to a channel on which the first wireless interface is operating.

11. The method according to claim 9, wherein
the second wireless interface periodically transmits a control signal on the predetermined channel.

12. The method according to claim 9, wherein
the predetermined channel is included in a frequency band in which the channel on which the first wireless interface is operating is included.

13. The method according to claim 12, wherein
the predetermined channel is a channel on which the wireless terminal preferentially performs scanning in the frequency band.

14. The method according to claim 12, wherein
the predetermined channel is a channel not adjacent to the channel on which the first wireless interface is operating in the frequency band.

15. The non-transitory computer readable medium according to claim 10, wherein
the second wireless interface periodically transmits a control signal on the predetermined channel.

16. The non-transitory computer readable medium according to claim 10, wherein
the predetermined channel is included in a frequency band in which the channel on which the first wireless interface is operating is included.

17. The non-transitory computer readable medium according to claim 16, wherein
the predetermined channel is a channel on which the wireless terminal preferentially performs scanning in the frequency band.

18. The non-transitory computer readable medium according to claim 16, wherein
the predetermined channel is a channel not adjacent to the channel on which the first wireless interface is operating in the frequency band.

* * * * *